United States Patent
Hegge et al.

(10) Patent No.: US 12,013,508 B2
(45) Date of Patent: Jun. 18, 2024

(54) METHOD AND SYSTEM FOR DETERMINING SEISMIC PROCESSING PARAMETERS USING MACHINE LEARNING

(71) Applicant: SAUDI ARABIAN OIL COMPANY, Dhahran (SA)

(72) Inventors: Robertus F. Hegge, Rijswijk (NL); Paul M. Zwartjes, Wassenaar (NL); Roald van Borselen, Voorschoten (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 134 days.

(21) Appl. No.: 17/452,709

(22) Filed: Oct. 28, 2021

(65) Prior Publication Data
US 2023/0140656 A1    May 4, 2023

(51) Int. Cl.
*G01V 1/34* (2006.01)
*G01V 1/30* (2006.01)
(Continued)

(52) U.S. Cl.
CPC .................. *G01V 1/34* (2013.01); *G01V 1/30* (2013.01); *G06N 3/045* (2023.01); *G06N 3/088* (2013.01);
(Continued)

(58) Field of Classification Search
CPC .. G01V 1/345; G01V 1/30; G01V 2210/1295; G01V 2210/1425;
(Continued)

(56) References Cited

U.S. PATENT DOCUMENTS 8,983,779 B2    3/2015  Liu et al.
9,702,997 B2    7/2017  Sava et al.
(Continued)

FOREIGN PATENT DOCUMENTS

KR         102142403 B1    8/2020
WO       2019/067960 A1    4/2019
(Continued)

OTHER PUBLICATIONS

Knibbe, H et al.; "Closing the performance gap between an iterative frequency-domain solver and an explicit time- domain scheme for 3D migration on parallel architectures;" Geophysics; vol. 79, No. 2; Mar.-Apr. 2014; pp. S47-S61 (15 pages).
(Continued)

*Primary Examiner* — Catherine T. Rastovski
*Assistant Examiner* — Yossef Korang-Beheshti
(74) *Attorney, Agent, or Firm* — Osha Bergman Watanabe & Burton LLP

(57) ABSTRACT

A method may include obtaining an input gather regarding a geological region of interest. The method may further include obtaining parameterization data regarding a seismic processing operation. The parameterization data may correspond to a first set of process parameter values that are different from a second set of process parameter values that are used to generate the input gather. The method may further include generating a predicted output gather using a machine-learning model, the input gather, and the parameterization data. The machine-learning model may include an encoder model and a decoder model. The method may further include generating a seismic image of the geological region of interest using the predicted output gather.

17 Claims, 10 Drawing Sheets

(51) Int. Cl.
G06N 3/045 (2023.01)
G06N 3/088 (2023.01)

(52) U.S. Cl.
CPC .............. *G01V 2210/1295* (2013.01); *G01V 2210/1425* (2013.01); *G01V 2210/32* (2013.01); *G01V 2210/64* (2013.01)

(58) Field of Classification Search
CPC ........... G01V 2210/32; G01V 2210/64; G06N 3/045; G06N 3/088
See application file for complete search history.

(56) References Cited

U.S. PATENT DOCUMENTS

| | | | |
|---|---|---|---|
| 2015/0185342 A1* | 7/2015 | van Groenestijn | G01V 1/364 702/14 |
| 2016/0320512 A1 | 11/2016 | Zhao et al. | |
| 2018/0336464 A1 | 11/2018 | Karras et al. | |
| 2019/0064389 A1* | 2/2019 | Denli | G01V 99/005 |
| 2019/0122108 A1 | 4/2019 | Kliegl et al. | |
| 2019/0302290 A1* | 10/2019 | Alwon | G01V 99/005 |
| 2019/0324167 A1 | 10/2019 | Zhang | |
| 2019/0383965 A1 | 12/2019 | Salman et al. | |
| 2020/0183031 A1 | 6/2020 | Denli et al. | |
| 2020/0264327 A1 | 8/2020 | Gadylshin et al. | |
| 2020/0301036 A1 | 9/2020 | Ramfjord et al. | |
| 2020/0379135 A1 | 12/2020 | Hou et al. | |
| 2021/0123334 A1* | 4/2021 | Madasu | G06N 3/08 |
| 2021/0133539 A1 | 5/2021 | Srivastava et al. | |
| 2021/0372258 A1* | 12/2021 | Kazemi Nojadeh | G01V 1/46 |
| 2022/0237891 A1* | 7/2022 | Xu | G01V 3/02 |
| 2023/0093005 A1 | 3/2023 | Lowell et al. | |
| 2023/0105422 A1* | 4/2023 | Pickles | G06N 3/045 705/7.31 |

FOREIGN PATENT DOCUMENTS

| | | | |
|---|---|---|---|
| WO | 2020252419 A1 | 12/2020 | |
| WO | WO-2022204682 A1 * | 9/2022 | |
| WO | WO-2022207573 A1 * | 10/2022 | |

OTHER PUBLICATIONS

Liu, Wei et al., "Accelerating High-Resolution Seismic Imaging by Using Deep Learning"; MDPI Open Access Journals: Applied Sciences; vol. 10, Issue 7, Article 2502; pp. 1-16; Apr. 5, 2020 (16 pages).

Calderón-Macías, Carlos et al., "Artificial neural networks for parameter estimation in geophysics"; Geophysical Prospecting; vol. 48, Issue 1; pp. 21-47; Dec. 24, 2001 (27 pages).

Biswas, Reetam et al., "Estimating normal moveout velocity using the recurrent neural network"; Interpretation; vol. 7, Issue 4; pp. T819-T827; Nov. 2019 (9 pages).

International Search Report and Written Opinion of the International Searching Authority issued is corresponding International Application No. PCT/US2022/018995, mailed Jun. 2, 2022 (12 pages).

Bougher, Benjamin Bryan, "Machine learning applications to geophysical data analysis"; A thesis submitted in partial fulfillment of the requirements for the degree of Master of Science in the Faculty of Graduate and Postdoctoral Studies; The University of British Columbia; pp. ii-73; Aug. 2016 (86 pages).

Non-Final Office Action issued in corresponding U.S. Appl. No. 17/194,106, mailed Aug. 31, 2023 (30 pages).

Yang, Fangshu, and Jianwei Ma. "Deep-learning inversion: A next-generation seismic velocity model builing method." Geophysics 84, No. 4 (2019): R583-R599 (Year: 2019).

First Examination Report issued in Saudi Arabian Application No. 122440440, dated Feb. 21, 2024 (13 pages).

* cited by examiner

METHOD AND SYSTEM FOR DETERMINING SEISMIC PROCESSING PARAMETERS USING MACHINE LEARNING

BACKGROUND

Various seismic processing operations are performed on seismic data from a survey to convert time-based seismic data into a depth representation of a subsurface. For example, seismic processing operations may include surface multiple filtering and other noise removal operations. Likewise, seismic processing may also include application of migration algorithms to a velocity model based on acquired seismic data. As such, different process parameters may be used in different seismic scenarios to determine proper input data for a given seismic processing operation. However, adjusting process parameters for processing seismic data may be a time-consuming task that requires multiple iterations to obtain the desired process parameters.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, an input gather regarding a geological region of interest. The method further includes obtaining, by the computer processor, parameterization data regarding a seismic processing operation. The parameterization data corresponds to a first set of process parameter values that are different from a second set of process parameter values used to generate the input gather. The method further includes generating, by the computer processor, a predicted output gather using a machine-learning model, the input gather, and the parameterization data. The machine-learning model includes an encoder model and a decoder model. The method further includes generating, by the computer processor, a seismic image of the geological region of interest using the predicted output gather.

In general, in one aspect, embodiments relate to a method that includes obtaining, by a computer processor, a machine-learning model including an encoder model and a decoder model. The method further includes obtaining, by the computer processor, various input gathers based on a seismic processing operation. The method further includes obtaining, by the computer processor, parameterization data for the seismic procession operation. The method further includes generating, by the computer processor, a predicted output gather using the machine-learning model, at least one of the input gathers, and the parameterization data. The method further includes updating, by the computer processor, the machine-learning model using a machine-learning algorithm and error data. The error data describes a mismatch between the predicted output gather and the at least one of the input gathers.

In general, in one aspect, embodiments relate to a system that includes a seismic surveying system including a seismic source and various seismic receivers, and a seismic interpreter that includes a computer processor. The seismic interpreter is coupled to the seismic surveying system. The seismic interpreter obtains an input gather regarding a geological region of interest. The seismic interpreter further obtains parameterization data regarding a seismic processing operation. The parameterization data corresponds to a first set of process parameter values that are different from a second set of process parameter values used to generate the input gather. The seismic interpreter further generates a predicted output gather using a machine-learning model, the input gather, and the parameterization data. The machine-learning model includes an encoder model and a decoder model. The seismic interpreter generates a seismic image of the geological region of interest using the predicted output gather.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
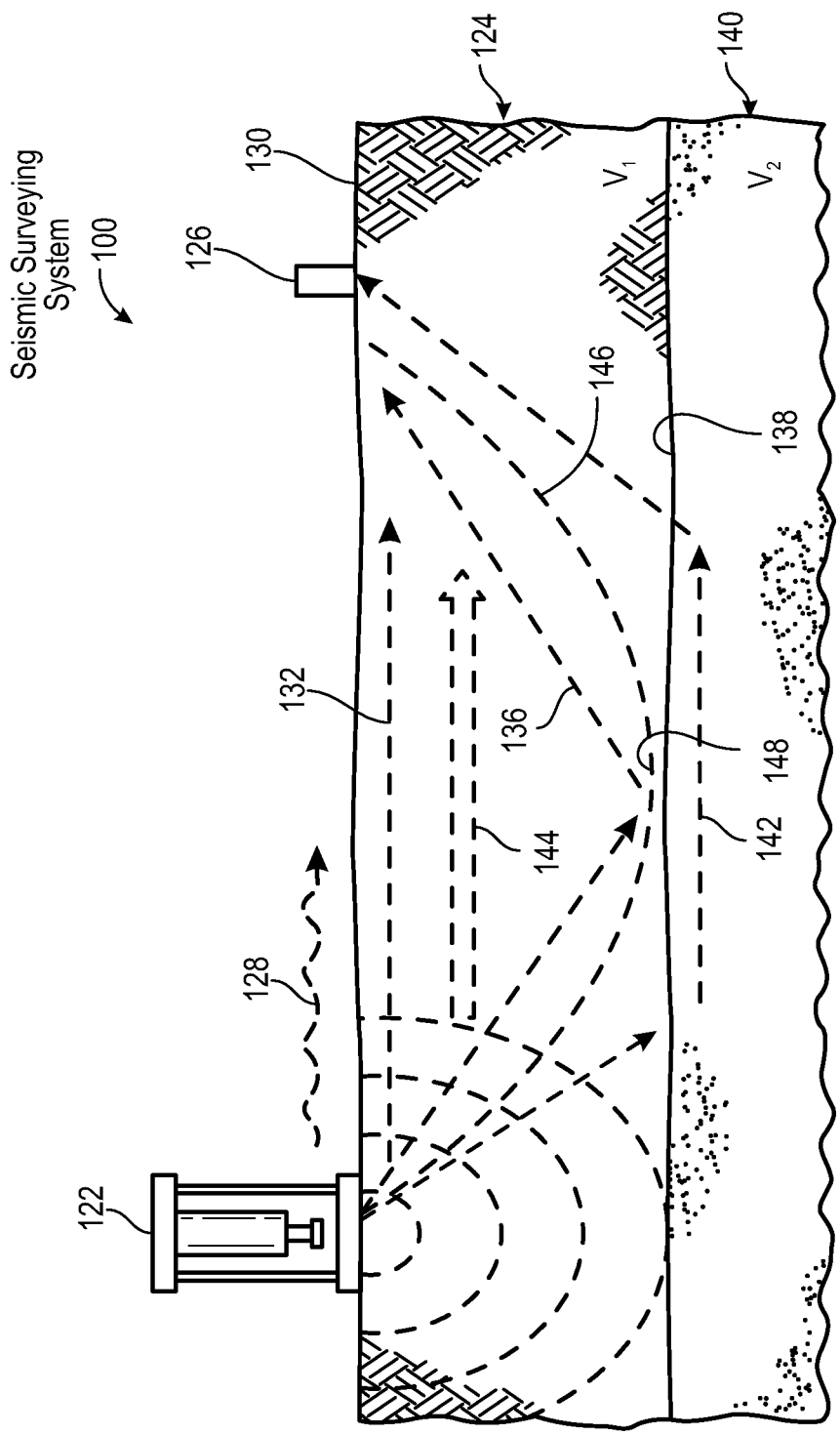
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining seismic data based on different parameterizations using machine learning, e.g., for evaluating the best results of different process parameter values. In particular, some embodiments use machine learning to replicate one or more actions of a seismic processing operation as a substitute for performing the seismic processing operation with each set of process parameter values. For example, a machine-learning model may obtain processed seismic data (e.g., an input gather) and parameterization data (e.g., a particular set of process parameter values) as input features to produce predicted output data (e.g., a predicted output gather with the particular set of process parameter values). The predicted output data with the best results may then be used for further seismic data processing, such as in a reverse-time migration algorithm.

In some embodiments, the machine-learning model includes an encoder model that transforms input gathers into compressed data (e.g., a latent representation vector or a latent representation distribution). The compressed data may be amalgamated with a vector representation of the parameterization data in this latent space domain. The machine-learning model may also include a decoder model that transforms the combined data into the corresponding output data that matches the results of a seismic processing operation with a desired parameterization. In some embodiments, the machine-learning model is a variational autoencoder.

Furthermore, testing different values of process parameters may be a time-consuming operation that requires an iterative and sequential testing process to evaluate different results in order to find an optimum result. Thus, some embodiments use machine learning to improve seismic data processing functionality by using past seismic processing results to determine other processing results based on different parameterizations. Accordingly, a machine-learning model may enable a computer system to perform more seismic processing operations over a specific period of time. On the other hand, a computer system may also proceed to the next seismic processing operation faster with an acceptable processing result by implementing such machine learning.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a particle velocity $V_1$ for detection at a number of seismic receivers (126) along the line of profile. Likewise, particle velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a particle velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a particle velocity $V_1$, while subsurface layer (140) has a particle velocity $V_2$. In words, different subsurface layers may correspond to different particle velocity values. In particular, a particle velocity may refer to the speed that a pressure wave travels through a medium, e.g., diving wave B (146) that makes a curvilinear ray path (148) through subsurface layer (124). Particle velocity may depend on a particular medium's density and elasticity as well as various wave properties, such as the frequency of an emitted pressure wave. Where a particle velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the particle velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the particle velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a global optimum that satisfies a predetermined criterion.

With respect to velocity models, a velocity model may map various subsurface layers based on particle velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
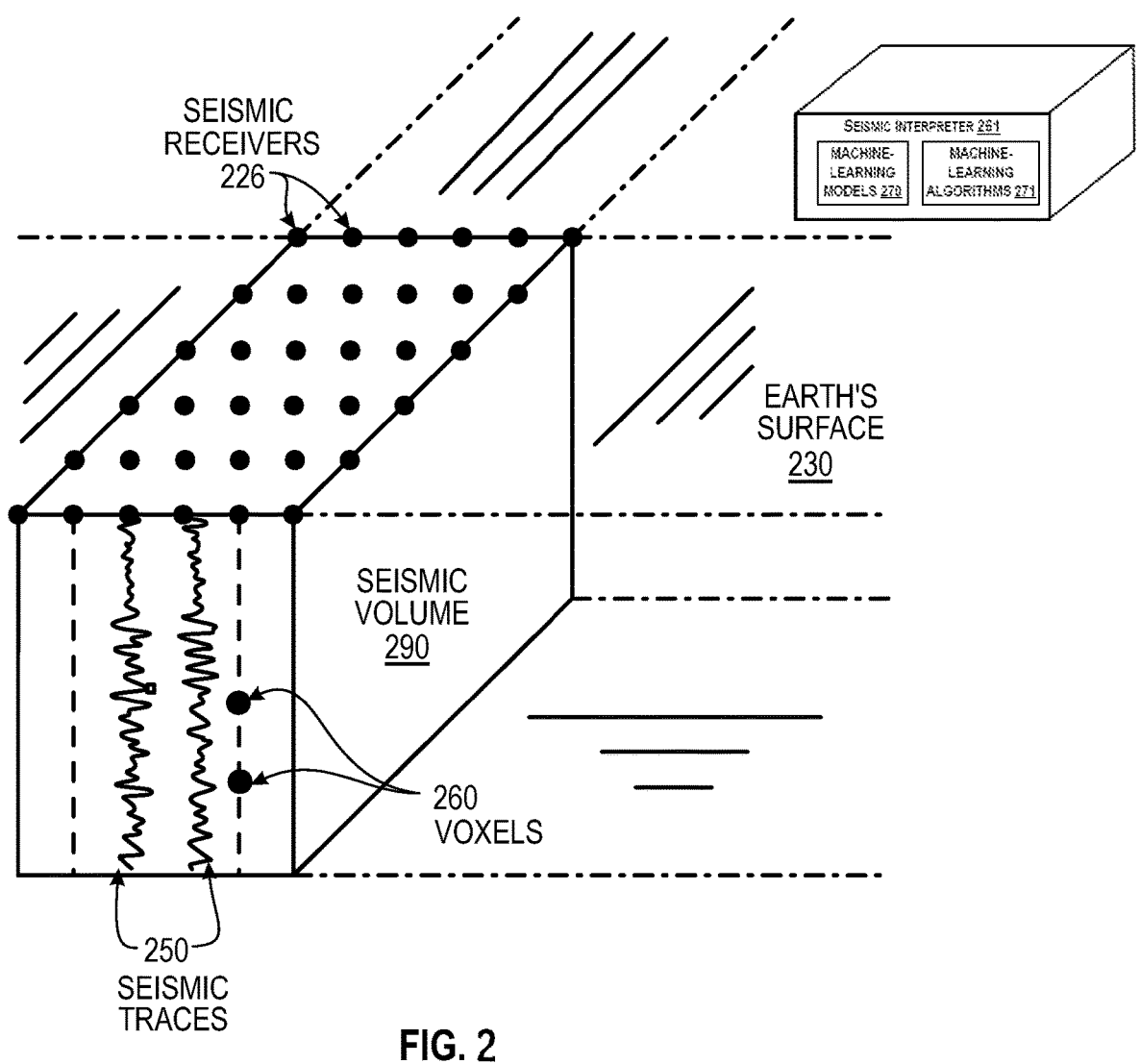

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the downgoing wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, Normal Move Out (NMO) corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection travel times. However, NMO-stack results may not indicate an accurate subsurface geology, where the subsurface geology is complex with large heterogeneities in particle velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) (also called a "seismic processing system") may include hardware and/or software with functionality for storing the seismic volume (290), well logs, core sample data, and other data for seismic data processing, well data processing, training operations, and other data processes accordingly. In some embodiments, the seismic interpreter (261) may include a computer system that is similar to the computer (902) described below with regard to FIG. 9 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Keeping with the seismic interpreter (261), seismic interpreter (261) may include hardware and/or software with functionality for generating one or more machine-learning models (270) for use in analyzing seismic data and one or more subsurface formations. For example, seismic interpreter (261) may use and/or process seismic data as well as other types of data to generate and/or update one or more machine-learning models (270) and/or one or more velocity models. Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include decision trees and neural networks. In some embodiments, the seismic interpreter (261) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights and biases for adjusting the data inputs. These network weights and biases may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, a seismic interpreter uses a machine-learning model to predict output gathers for specific parameterizations for one or more seismic processing operations. For example, a machine-learning model may include an encoder model that transforms input data to a latent representation vector. The machine-learning model may further amalgamate the latent representation vector with a vector representation of a particular parameterization to produced combined data, e.g., using in a latent space domain. Likewise, the machine-learning model may also include a decoder model that transforms the combined vector into the corresponding output data according to the parameterization.

In some embodiments, the machine-learning model is a variational autoencoder. For example, variational autoencoders may compress input information into a constrained multivariate latent distribution through encoding in order to reconstruct the information during a decoding process. Thus, variational autoencoders may be used in unsupervised, semi-supervised, and/or supervised machine-learning algorithms. More specifically, variational autoencoders may perform a dimensionality reduction that reduces the number of features within an input dataset (such as an input gather). This dimensionality reduction may be performed by selection (e.g., only some existing features are preserved) or by extraction (e.g., a reduced number of new features are produced from preexisting features). Thus, an encoder process may compress the input data (i.e., from an initial space to an encoded space or latent space), while a decoder process may decompress the compressed data. This compression may be lossy, such that a portion of the original information in the input dataset cannot be recovered during the decoding process.

In some embodiments, various types of machine learning algorithms (e.g., machine-learning algorithms (271)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the electronic model.

Figure 3:
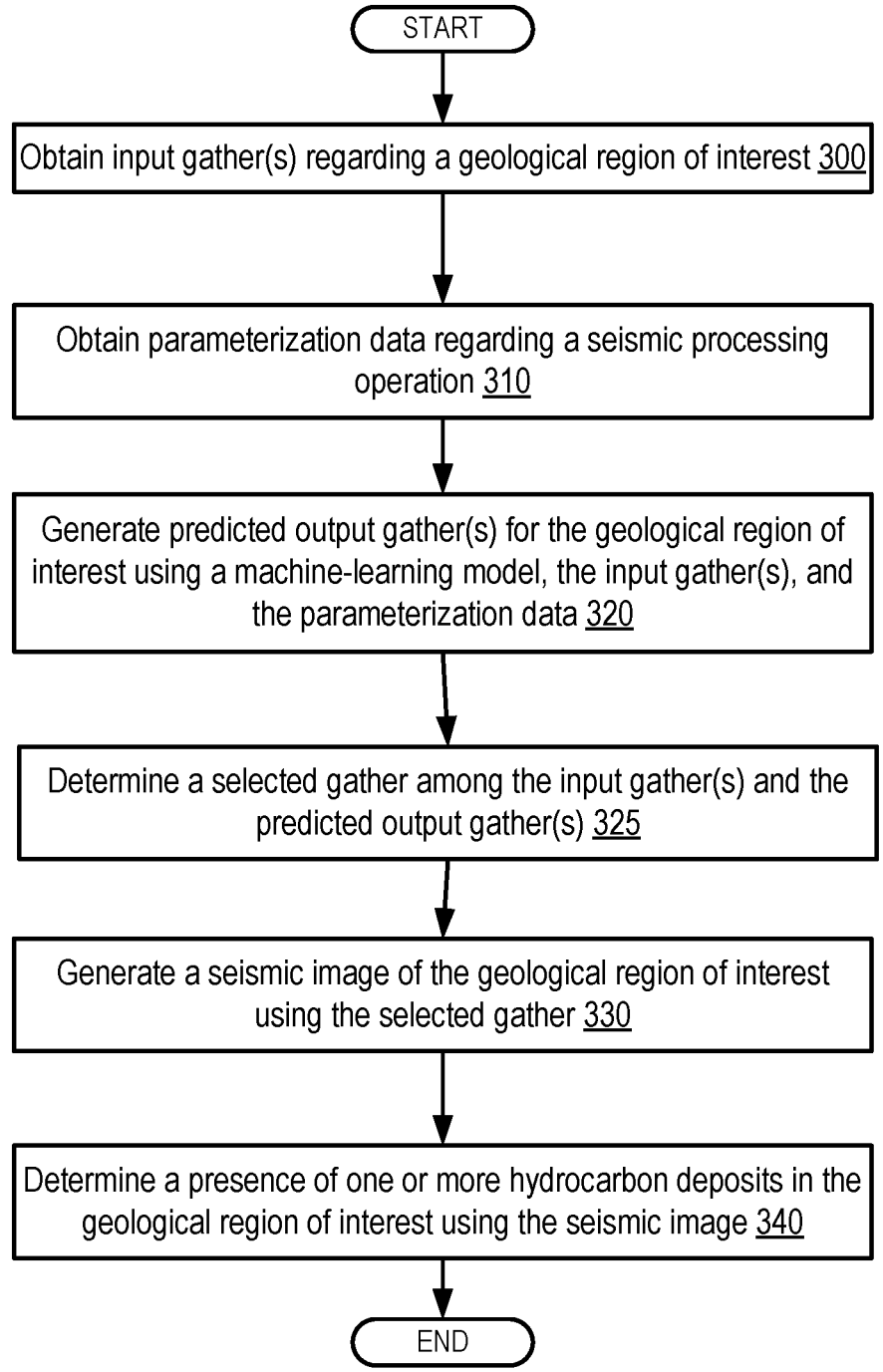
FIG. 3 shows a flowchart in accordance with one or more embodiments.

Turning to FIG. 3, FIG. 3 shows a flowchart in accordance with one or more embodiments. Specifically, FIG. 3 describes a general method for using predicted output gathers using machine learning. One or more blocks in FIG. 3 may be performed by one or more components (e.g., seismic interpreter (261)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, one or more input gathers are obtained regarding a geological region of interest in accordance with one or more embodiments. While testing all possible combinations of process parameter values may be virtually impossible, testing may begin with default values and some typical variations of the values. As such, the input gathers may correspond to an initial set of processing results based on the initially selected process parameter values. Furthermore, a geological region of interest may be a portion of a geological area or volume that includes one or more formations of interest desired or selected for analysis, e.g., for determining location of hydrocarbons or reservoir development purposes. The seismic data may be similar to the seismic data described above in FIG. 2 and the accompanying description.

In Block 310, parameterization data is obtained regarding a seismic processing operation in accordance with one or more embodiments. A seismic processing operation may be performed using a certain parameterization. Examples of seismic processing operations may include seismic inversion processes, normal moveout (NMO) corrections, seismic migration functions, dip moveout (DMO) corrections, demultiple functions that remove surface multiples, and/or various filtering processes. Thus, parameterization data may include or describe various process parameter values for performing one or more seismic processing operations. Examples of process parameters may include one or more threshold values, a filter length, a predetermined noise level, a window size, a water bottom reflectivity, a water depth, a maximum frequency, a spatial distance between consecutive seismic traces, a number of azimuth sectors, an inline aperture, and a crossline aperture.

In Block 320, one or more predicted output gathers are generated for a geological region of interest using a machine-learning model, one or more input gathers, and parameterization data in accordance with one or more embodiments. Input gathers and parameterization data may be used as inputs to a machine-learning model that produces output gathers at the output layer of the model. In other words, an input gather in a specific data domain may be used to produce an output gather in the same data domain but with a different parameterization. Thus, rather than increasing the speed of a seismic processing operation, machine learning may reduce the time required for evaluating different results of a seismic processing operation. Accordingly, a seismic interpreter may use a machine-learning model to predict output gathers based on different parameterizations, e.g., for performing comparisons to select an optimum set of process parameter values and/or the optimum gather for further seismic data processing. In other words, the machine-learning model may predict gather data for different parameterizations that have not been performed using a particular seismic processing operation, e.g., to save computational time.

In some embodiments, the machine-learning model includes a machine-learning architecture that includes multiple models. For example, a machine-learning architecture may correspond to an autoencoder architecture that includes two or more artificial neural networks that operate in conjunction. An initial neural network may transforms various input images (e.g., input gathers) into a specific data domain, such as a latent space. A transformation into the latent space may be a projection onto a set of implicitly determined features representing those images. Thus, the initial neural network may be an encoder model, while another neural network perform an opposite operation. For example, the other neural network may be a decoder model that decodes values in the latent space to produce a particular output image (e.g., a predicted output gather). Using a combination of an encoder model and a decoder model, a machine-learning architecture may reconstruct an original input. In some embodiments, the machine-learning model is a variational autoencoder (VAE). A variational autoencoder may use a distribution instead of a vector in the latent space representation. In the latent space, for example, the variational autoencoder may operate on two different vectors, where one vector corresponds to a mean of a distribution and another vector may correspond to a standard deviation of a particular distribution.

Furthermore, by extending latent space with the process parameter values before a decoder model is used, a machine-learning architecture may reconstruct an image with a particular parameterization. This particular parameterization may be different from the parameterization of the input images. For illustration purposes, where input parameter values are set to neutral values (e.g., all zeroes), the normal behavior of a decoder may be produce an output image that is an exact match of an input image. In some embodiments, input parameterization data may be transmitted directly to a decoder model within the architecture for reconstructing output gathers. In some embodiments, a portion or all of input parameterization data values is transformed by an encoder model prior to being used within the latent space.

In some embodiments, a machine-learning model includes a combined network that includes two or more cascaded networks that generate migrated gathers directly from input gathers. Where one set network may produce a predicted output gather according to a predetermined parameterization, the other network may generate a migrated gather using the predicted output gather. For example, the second cascaded network may be similar to the trained model described below in section titled FASTER SEISMIC IMAGING USING MACHINE LEARNING and the accompanying description.

In Block 325, a selected gather is determined among one or more input gathers and one or more predicted output gathers in accordance with one or more embodiments. For example, the impact of different process parameter choices may be evaluated to determine a desired processing result, either an input gather based on performance of an actual seismic processing operation or a predicted output gather obtained from machine learning. Thus, a seismic interpreter may iterate this process to produce multiple predicted output gathers with different parameterizations. Eventually, an optimum parameterization for obtaining a gather may be selected among different parameterizations, e.g., automatically based on a predetermined criterion or based on review by a human analyst.

In Block 330, a seismic image of a geological region of interest is generated using a selected gather in accordance with one or more embodiments. Once a gather and parameterization are selected for further processing, a seismic interpreter may use one or more seismic processing operations to generate a seismic image of a geological region of interest. These additional seismic processing operations may include migration operations as well as other types of operations.

In some embodiments, the machine-learning model that generates predicted output gathers also generates one or more seismic images using the predicted output gathers. Likewise, a separate machine-learning model may be used to generate a seismic image of a geological region of interest. On the other hand, predicted output gathers may be used as an input to one or more seismic processing operations, such as a migration function that performs reverse-time migration. In some embodiments, the seismic image provides a spatial and depth illustration of a subsurface formation for various practical applications, such as predicting hydrocarbon deposits, predicting wellbore paths for geosteering, etc.

In Block 340, a presence of one or more hydrocarbon deposits are determined in a geological region of interest using a seismic image in accordance with one or more embodiments.

Figure 4:
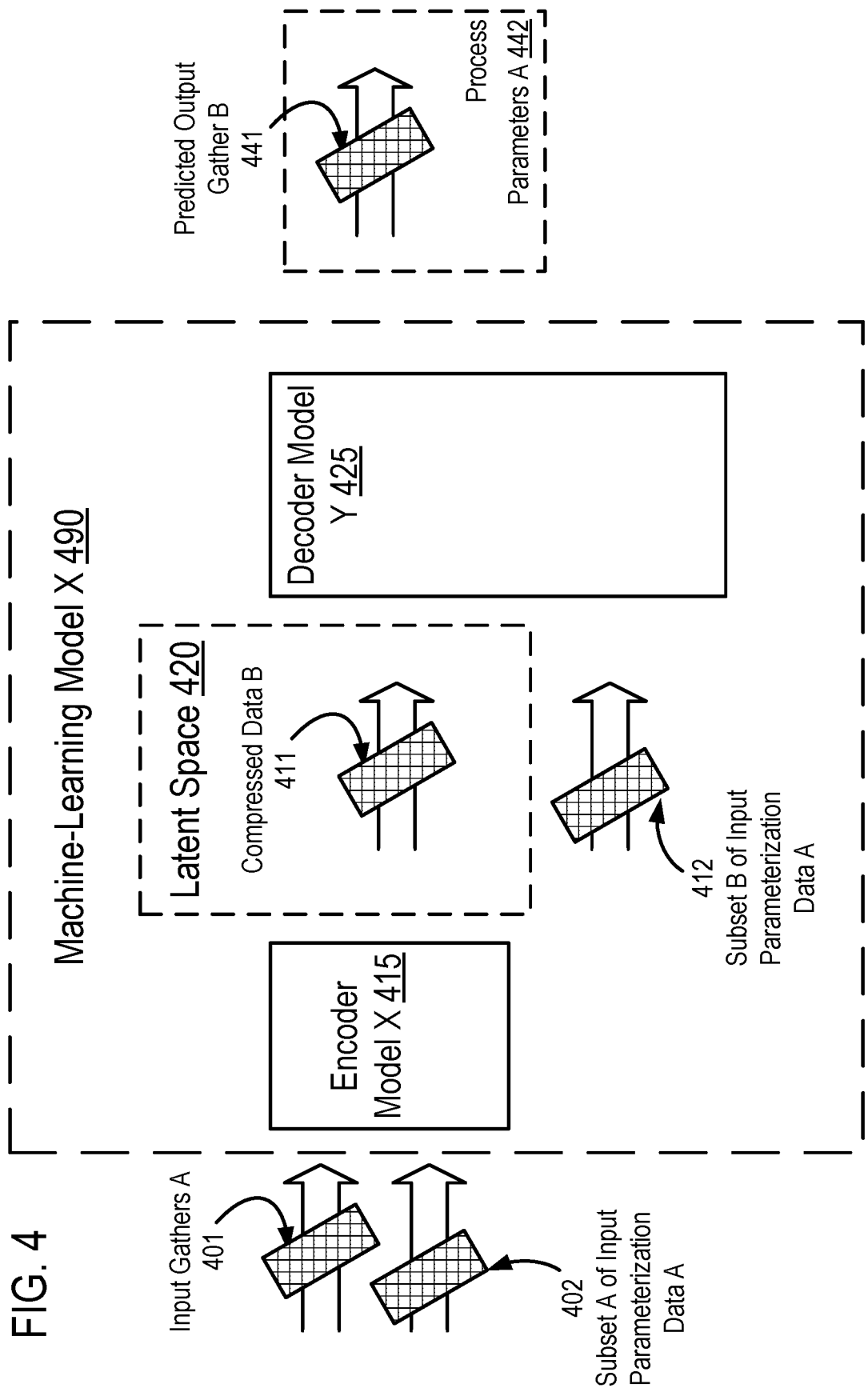
FIGS. 4 and 5 show examples in accordance with one or more embodiments.
Figure 5:
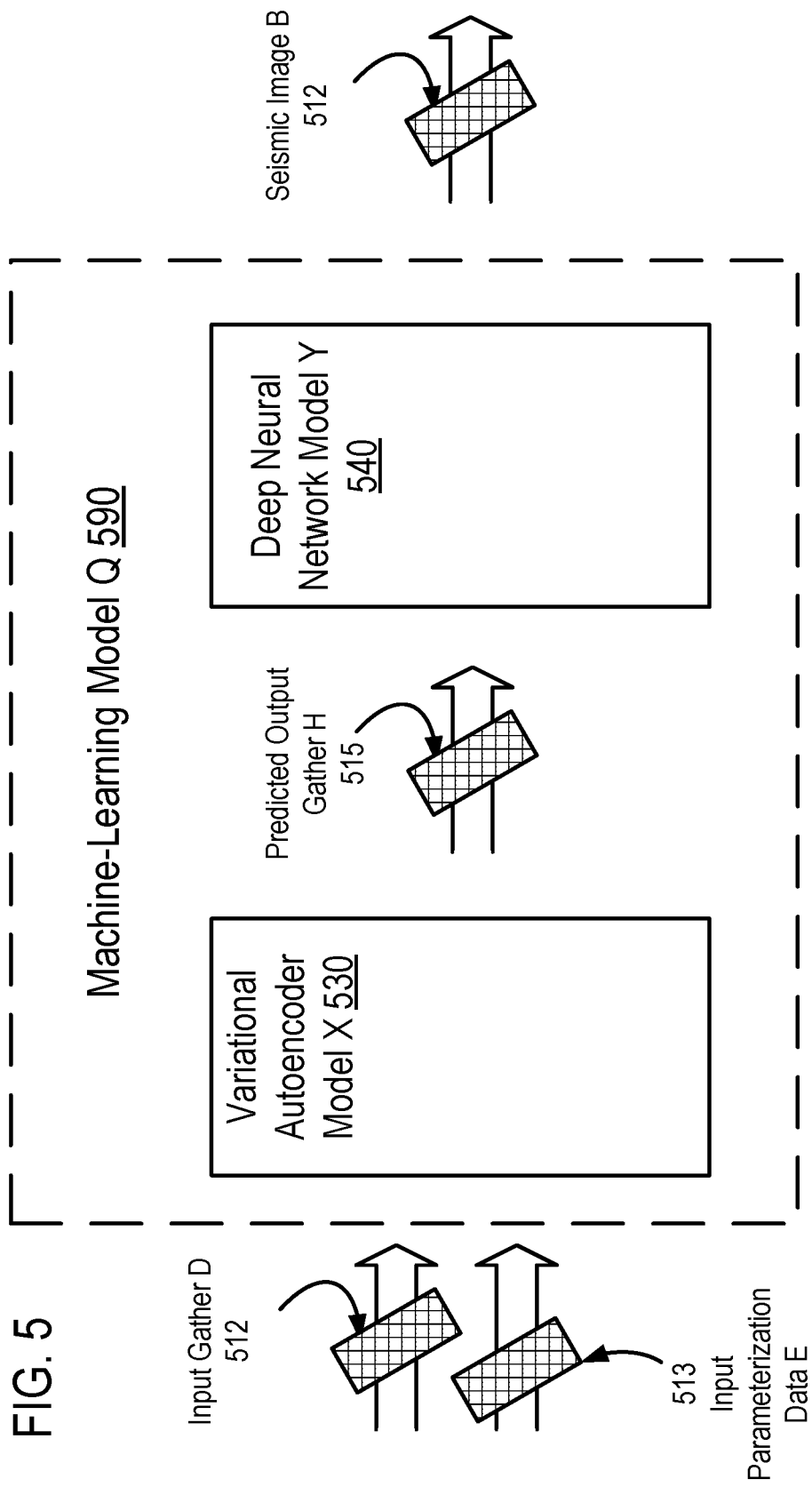

Turning to FIGS. 4 and 5, FIGS. 4 and 5 provide examples of predicting output gathers according to a predetermined parameterization using one or more machine-learning models in accordance with some embodiments. The following examples are for explanatory purposes only and not intended to limit the scope of the disclosed technology. In FIG. 4, a seismic interpreter (not shown) obtains input gathers A (401) that are processed from a seismic survey. The seismic interpreter also obtains an input parameterization data A (i.e., subset A (402) and subset B (412) of the input parameterization data A that corresponds to process parameters A (442)). The seismic interpreter includes a machine-learning model X (490) that includes an encoder model X (415) and a decoder model Y (425). Thus, the encoder model X (415) transforms the input gathers A (401) and subset A (402) of the input parameterization data A into compressed data B (411) in a latent space (420). As such, the compressed data B (411) is then input to a decoder model Y (425) along with the subset B (412) of input parameterization data A. The compressed data B (411) may be a latent distribution based on input gather data and parameterization data, for example. At the decoder model Y (425), the machine-learning model X (490) reconstructs gathers from the compressed data B (411) and the subset B (412) of input parameterization data to produce a predicted output gather B (441) with process parameters A (442).

In FIG. 5, a seismic interpreter (not shown) includes a machine-learning model Q (590). The machine-learning model Q (590) obtains input gather D (512) and input parameterization data E (513) at an input layer. Within the machine-learning model Q (590), a variational autoencoder model X (530) transforms the input gather D (512) and the input parameterization data E (513) into a predicted output gather H (515). The predicted output gather H (515) is then input to a deep neural network model Y (540). The machine-learning model Q (590) then outputs a seismic image B (512) accordingly.

Figure 6:
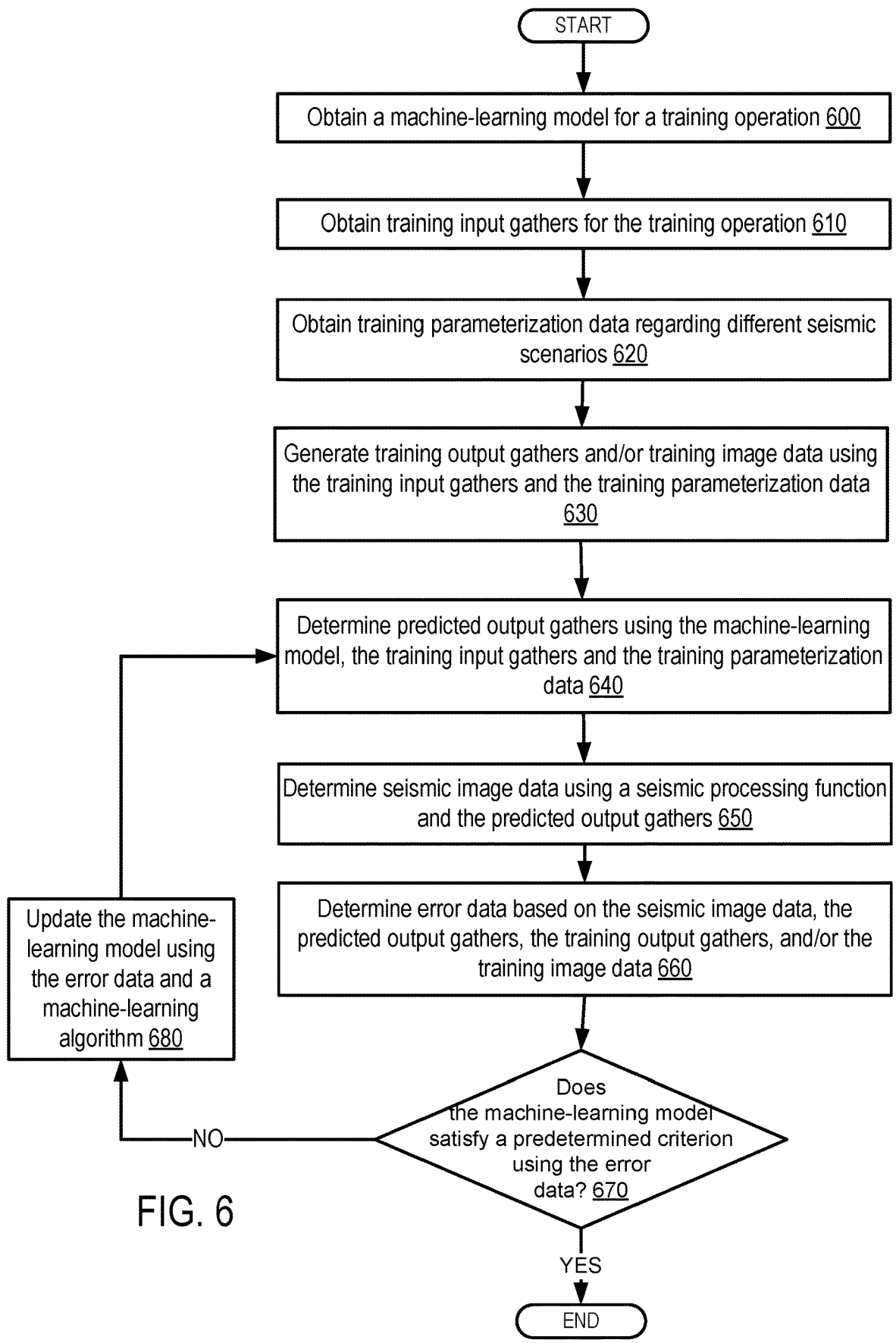
FIG. 6 shows a flowchart in accordance with one or more embodiments.

Turning to FIG. 6, FIG. 6 shows a flowchart in accordance with one or more embodiments. Specifically, FIG. 6 describes a general method for training a machine-learning model to predict output gathers and/or seismic image data. One or more blocks in FIG. 6 may be performed by one or more components (e.g., seismic interpreter (261)) as described in FIGS. 1-2. While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 600, a machine-learning model is obtained for a training operation in accordance with one or more embodiments. The machine-learning model may be a default model or a pre-trained model for use in a training operation. For example, the machine-learning model may be a variational autoencoder. By training a variational autoencoder, an encoder model and a decoder model may be jointly trained in order to reduce the reconstruction error between the input features and the output of the model. However, other types of machine-learning models are contemplated as well.

In Block 610, various training input gathers are obtained for a training operation in accordance with one or more embodiments. The input gathers in Block 610 may be similar to the input gathers described above in Block 300 and the accompanying description.

In Block 620, training parameterization data is obtained regarding different seismic scenarios in accordance with one or more embodiments. In some embodiments, for example, training parameterization data include process parameter values at minimum and maximum values of the range of reasonable values for a particular process parameter. Depending on the overall size of the range, one or more process parameter values may be used in the respective range. By training a machine-learning model, the model may generate output for any parameterization within various parameter ranges.

Furthermore, simply using gather data from different parameterizations for training may only produce a new output gather with an unknown mix of training input gathers and parameterizations. By using input gathers associated with known parameterizations, a machine-learning model may learn to approximate a function that predicts an output gather for a desired parameterization.

In Block 630, training output gathers and/or training image data are generated using training input gathers and training parameterization data in accordance with one or more embodiments. In particular, a combination of input gathers and corresponding output gathers with their respective parameterizations may be provided as a training dataset for a machine-learning model. In some embodiments, seismic images based on the output gathers may also be used as training data, e.g., in the case where a predicted output gather is automatically transmitted as an input into another machine-learning model that performs a fast reverse-time migration.

In Block 640, predicted output gathers are determined using a machine-learning model, various training input gathers, and training parameterization data in accordance with one or more embodiments.

In Block 650, seismic image data is determined using a seismic processing function and various predicted output gathers in accordance with one or more embodiments. Furthermore, various process parameters may be tested in the image space via analyzing a seismic image. For example, various common depth point (CDP) gathers may be obtained for different values of process parameters, such as to determine an optimize set of process parameter values.

In some embodiments, input and output of each processing test may also be usable as a set of training examples. Therefore we train a first network which performs a particular processing operation, such as generating output gathers, and then, by directly migrating the output gathers, a second network may be trained for migration using the input to and output of the migration.

In Block 660, error data is determined based on seismic image data, predicted output gathers, training output gathers, and/or training image data in accordance with one or more embodiments. For example, the error data may correspond to an amount of reconstruction loss between the predicted output gathers and training output gathers based on the same input gathers. Moreover, the error data may also be based on a distance loss, such as the distance between predicted and actual values in the latent space or an image space. Various error metrics may be used, such as mean-squared error or cross entropy.

In Block 670, a determination is made whether a machine-learning model satisfies a predetermined criterion using error data in accordance with one or more embodiments. For example, the predetermined criterion may be a predetermined degree of accuracy or a set number of machine-learning epochs to be completed during a training operation. Thus, a machine-learning algorithm may obtain a user input regarding the predetermined criterion for use in the model training. Likewise, depending on the amount of data error determined in Block 660, the machine-learning algorithm may automatically determine that the model is done training. When a determination is made that another machine-learning epoch is to be performed on the model, the process may proceed to Block 680. When a determination is made that the model is done training, the process may end.

In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined level of prediction accuracy. Thus, better training of a model may lead to better predictions by a trained model.

In Block 680, a machine-learning model is updated using error data and a machine-learning algorithm in accordance with one or more embodiments. In some embodiments, supervised machine learning is used to map input data to corresponding output data given example pairs of input and output data. Once trained, such machine-learning algorithms may map unseen input data to output data as required with good quality provided the unseen input data is within the range of input data used for training. Hence, the full set of training examples is a subset of the possible pairs of points, or, in other words cover a certain subspace of the input space and its corresponding output space. This can be seen as a form of interpolation. For input points located outside the input subspace, the ability of the neural network to generate the corresponding output will diminish with the distance to the subspace.

Figure 7A:
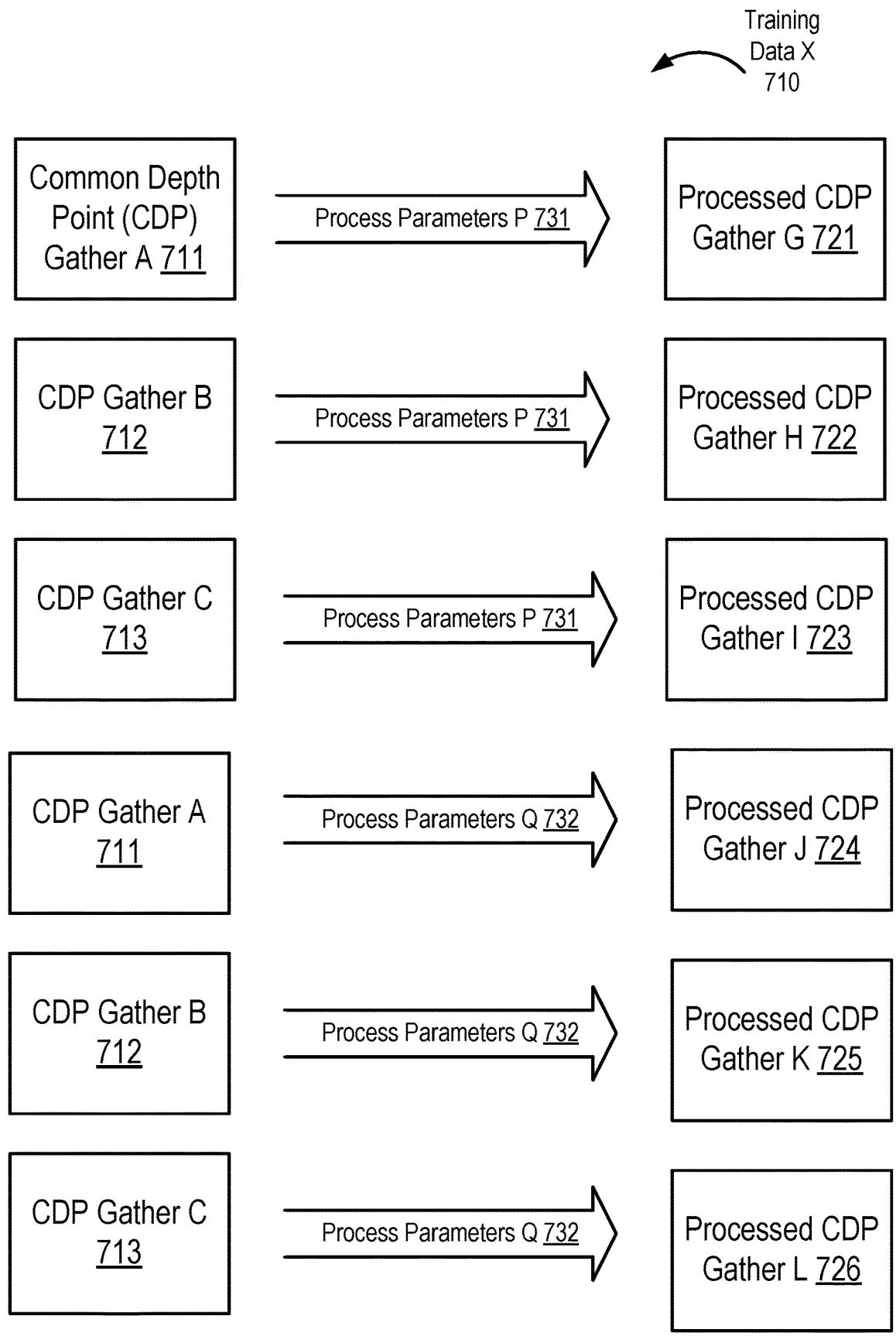
FIGS. 7A and 7B show an example in accordance with one or more embodiments.
Figure 7B:
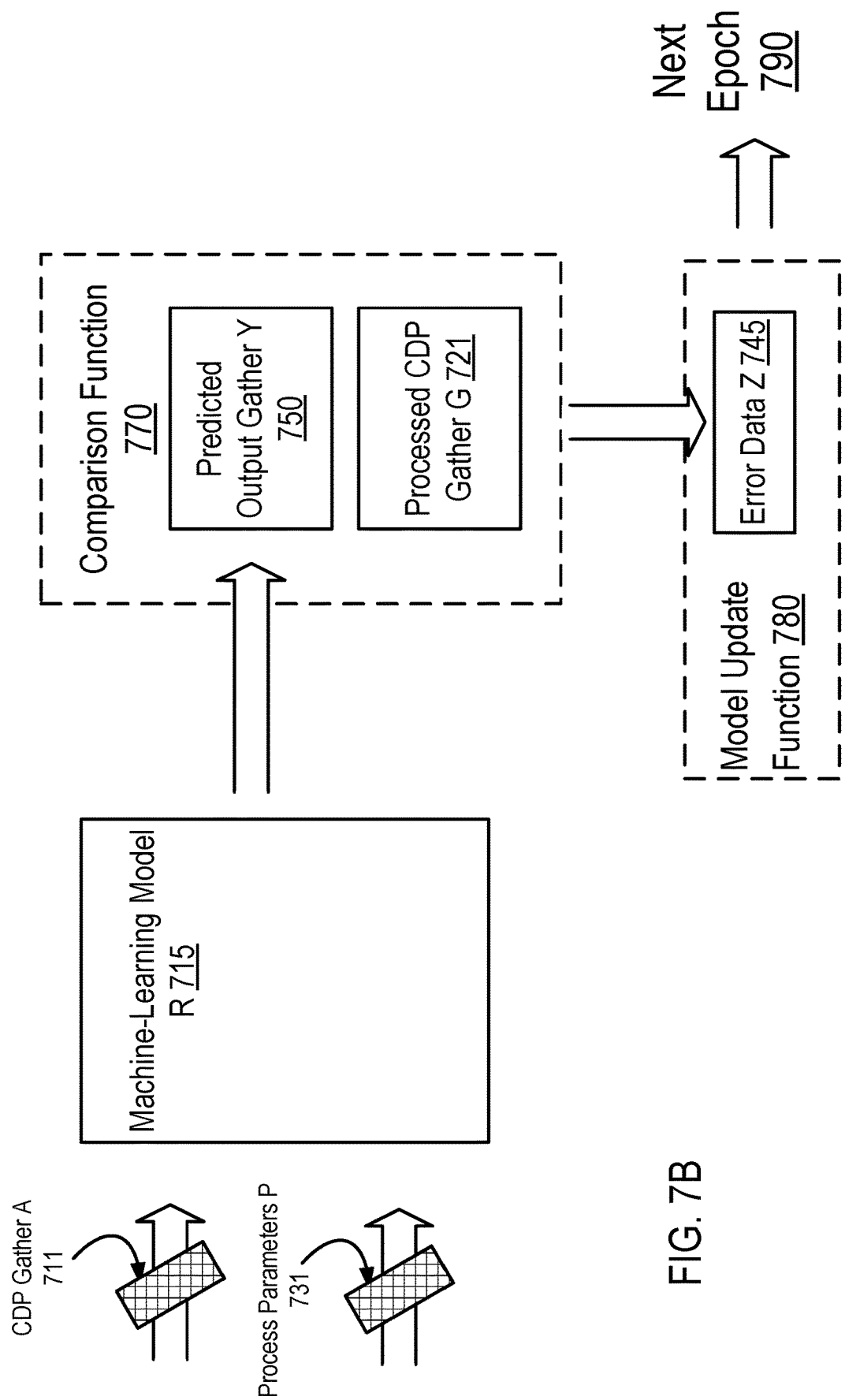

Turning to FIGS. 7A and 7B, FIGS. 7A and 7B provide an example of training a machine-learning model to predict output gathers in accordance with some embodiments. The following examples are for explanatory purposes only and not intended to limit the scope of the disclosed technology. In FIG. 7A, training data X (710) is shown that includes common depth point (CDP) gather A (711), CDP gather B (712), and CDP gather C (713). The training data X (710) also includes two sets of process parameters, i.e., process parameters P (731) and process parameters Q (732). The training data X (710) further includes processed gathers based on the process parameters (731, 732), i.e., processed CDP gather G (721), processed CDP gather H (722), processed CDP gather I (723), processed CDP gather J (724), processed CDP gather K (725), and processed CDP gather L (726).

In FIG. 7B, during an epoch during a training operation, a machine-learning model R (715) obtains the CDP gather A (711) and process parameters P (731) at an input layer. Subsequently, the machine-learning model R (715) generates a predicted output gather Y (750). A computer system performing the training operation then performs a comparison function (770) on the predicted output gather Y (750) with respect to a processed CDP gather G (721) based on performing a data operation using the process parameters P (731). The computer system subsequently determines error data Z (745) that describes the difference using a loss function between the predicted output gather Y (750) and the processed CDP gather G (721). As such, a model update function (780) is used by the computer system to determine a particular model update for the machine-learning model R (715) based on the error data Z (745). Because the machine-learning model R (715) has yet to satisfy a predetermined level of accuracy, the training operation proceeds to the next epoch (790).

Faster Seismic Imaging Using Machine Learning

Machine learning may be used in some embodiments to determine migrated image data from seismic data, such as seismic gathers. In particularly, some embodiments include dividing a seismic dataset into a set of pre-processed gathers that undergo reverse time migration using computationally-intensive migration algorithms. For example, seismic data may be grouped within one or more seismic gathers according to various spatial coordinates, such as according to a common shot, a common receiver, a common midpoint, or a common offset. Likewise, the seismic dataset also includes a larger set of pre-processed gathers that are used as an input to a trained machine-learning model that approximates the computations performed by the migration algorithms. To train the machine-learning model, the smaller seismic gather set may be used to produce a set of training gathers that are used as training data and testing data. Once all of the pre-processed gathers have been migrated, a final stacked image may be generated for a geological region of interest.

In some embodiments, this machine-learning model is a neural network that has been pre-trained to predict migrated image data. To train a neural network, its architecture is first selected, e.g., in order to serve as a convolutional neural network (CNN), U-net model, a recurrent neural network, etc. The neural network may include network parameters that are initialized as random numbers, where the parameters may be updated/improved via "training." Examples of training operations may include performing gradient descent methods that minimize a cost function defined using a misfit between predicted and actual outcomes. In the context of a "pre-trained" network, the network parameters are not random. For instance, a pre-trained network may have network parameters that were determined in a previous round of training (i.e., not random values), using another seismic survey. Thus, the actual outcome may be a migrated gather generated using a particular migration operator (e.g., reverse time migration). On the other hand, the predicted outcome may be the result of various operations performed by the neural network to an input gather.

By using machine learning to approximate migration techniques, some embodiments may lower the computational effort (and, thus the cost of seismic imaging) for generating a stacked seismic image. Accordingly, this computational reduction from migration algorithms may result in more seismic imaging during a seismic processing workflow.

Figure 8:
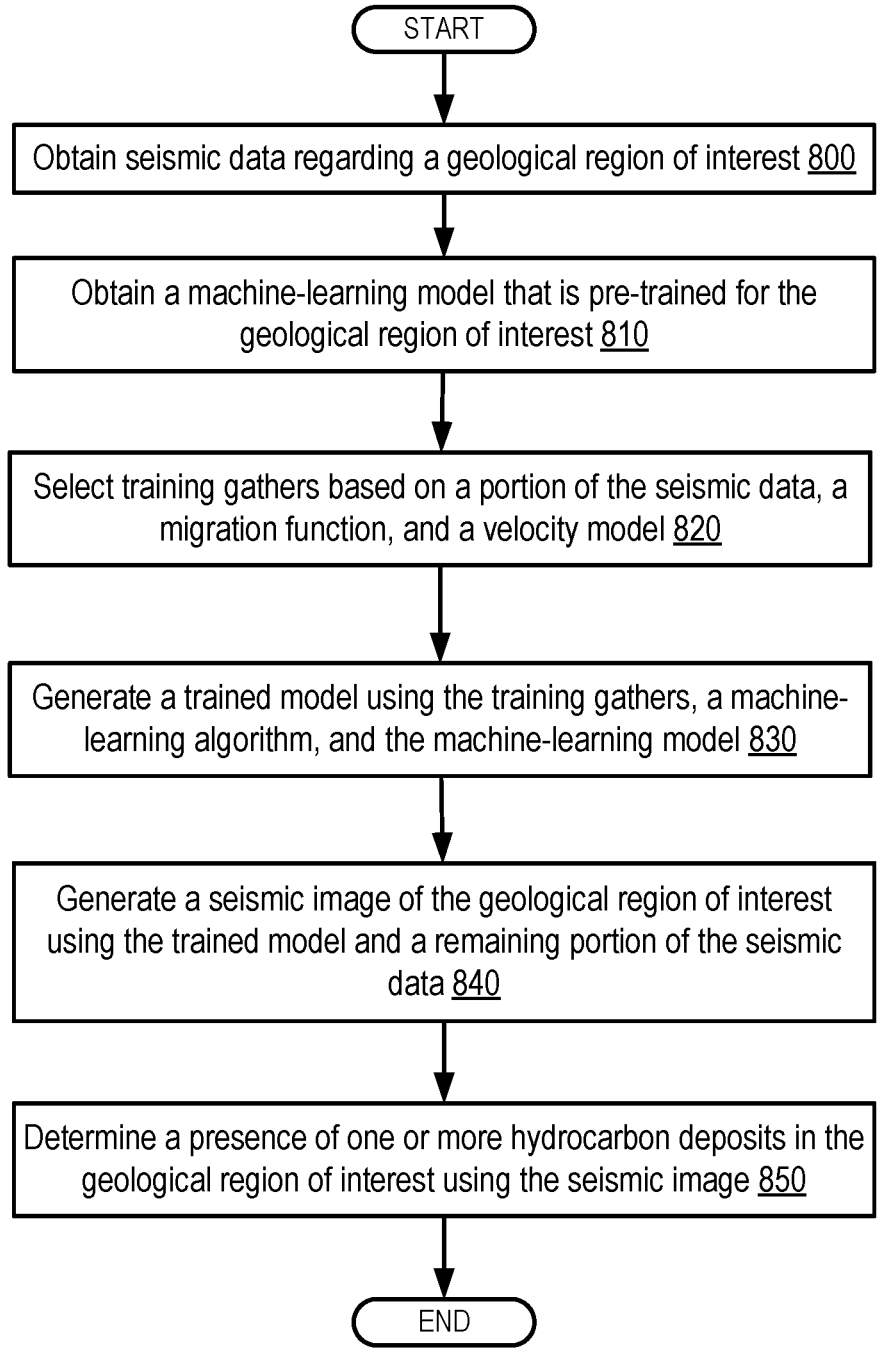
FIG. 8 shows a flowchart in accordance with one or more embodiments.

Turning to FIG. 8, FIG. 8 shows a flowchart in accordance with one or more embodiments. Specifically, FIG. 8 describes a general method for generating a seismic image using machine learning. One or more blocks in FIG. 8 may be performed by one or more components (e.g., seismic interpreter (261)) as described in FIGS. 1-2. While the various blocks in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 800, seismic data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data described above in FIG. 2 and the accompanying description.

In some embodiments, the seismic data includes pre-processed gathers, such as predicted output gathers generated using a machine-learning model. For example, a pre-processed gather may include a collection of seismic traces made according to some trace header parameter. During pre-processing, unwanted noise, surface waves, and multiple reflections may be removed from the raw seismic data such that only primary reflections from subsurface layers may remain in the pre-processed data. In some embodiments, the pre-processed gather is a shot gather, a common receiver gather, a common midpoint gather, or a common offset gather.

After removing this noise, the seismic data may be further processed into a shot gather that includes various dimensions, such as distance from a seismic source along a horizontal axis, and a time value since the seismic source (i.e., the "shot") was triggered (i.e., depicted along a vertical axis). In other words, a shot gather may correspond to a two-dimensional plot, where one axis corresponds to distance from a seismic source and another axis corresponds to time. In some embodiments, a shot gather corresponds to a three dimensional dataset, where the vertical axis represents time and two horizontal axes represent location coordinates. Moreover, pre-processed shot gathers may be divided into a training shot gather set that provides training data and testing data for machine learning. The pre-processed shot gathers may also include a remaining portion that provides input data for the trained model. Based on this input data, the trained model may output one or more seismic images of the geological region of interest.

In Block 810, a machine-learning model is obtained for a geological region of interest in accordance with one or more embodiments. For example, an initial model may be obtained and initialized with weights and/or biases prior to a training operation. In particular, the machine learning model may be capable of approximating solutions of complex non-linear problems, such as a neural network or an artificial neural network. Various types of neural networks are contemplated, such as a fully connected network (FCN), a deep neural network with three or more hidden layers, a convolutional neural network, and various other types of neural networks, such as a U-Net model. For example, a convolutional neural network may include various convolutional layers, pooling layers, fully connected layers, and/or normalization layers to produce a particular type of output or outputs. For more information on machine-learning models such as neural networks, see FIG. 2 above and the accompanying description.

In some embodiments, the machine-learning model is pre-trained for the geological region of interest. For example, some training operations may benefit from "transfer learning" between models trained using similar problems with different training datasets. Thus, a pre-trained model may refer to a model that was trained on a large benchmark dataset to solve a similar problem, such as seismic imaging based on seismic gathers. Accordingly, different types of pre-training processes may be performed to prepare for an actual training operation. In some embodiments, a pre-training operation may train only a portion of the hidden layers in a machine-learning model without changing the remaining hidden layers. In particular, lower hidden layers may refer to general features (i.e., hidden layers independent of a particular velocity model or geological region), while higher layers may refer to specific features (i.e., hidden layers that dependent). In some embodiments, a machine-learning architecture is reused from a previous model in order to retrain a new model. In some embodiments, a model may be pre-trained using legacy seismic data before a seismic data processing workflow begins (e.g., using data from previous seismic processing operations).

With respect to seismic imaging, a trained model may be specific to a given velocity model. As such, a machine-learning model may require retraining in order to be used with a different velocity model. By training a neural network for a similar but different imaging problem, a model may be initialized with neural network weights and biases that require fewer updates to approximate a different geological region of interest or velocity model. Thus, transfer learning may reduce training time for the current geological region.

In Block 820, training gathers are selected based on a portion of seismic data, a migration function, and a velocity model in accordance with one or more embodiments. For example, a training gather may correspond to a pair of different gathers, i.e., an input gather and an output gather to the machine-learning model. The input gather may be an unmigrated gather and the output gather may be a migrated gather. After pre-processing the seismic data to produce various seismic gathers, time-based gathers are migrated using a migration function and a velocity model. The velocity model may correspond to the particle velocity with which pressure waves propagate through the geological region of interest. Thus, the velocity model may be obtained from velocity analysis on legacy seismic data or generated using a seismic inversion technique. Likewise, synthetic gathers may be used in place of recorded seismic data, because a model may not be able to learn the migration function based on raw seismic data alone. In other words, a machine-learning model may not be able generalize to an unseen velocity model or seismic data with very different characteristics (e.g., due to the presence of different kinds of noise in the data). For more information on velocity models, see FIGS. 1-2 above and the accompanying description.

Furthermore, synthetic or real gathers may provide a training dataset for training a machine-learning model. In particular, the training gathers may correspond to a predetermined percentage of seismic data in a specific dataset. Thus, the remaining portion of seismic gathers may be greater than the number of training gathers. During training, a time-based gather may provide input features to the machine-learning model, while the migrated gather may correspond to the predicted output of the model where the vertical axis is in time or depth. Thus, these training gathers may include an input-output pair for training the model in a particular epoch. Likewise, training gathers may also provide testing data for determining whether the accuracy of the machine-learning model satisfies a predetermined criterion (e.g., an accuracy level of 90%). In some embodiments, the training gathers are based on augmented data and/or synthetic data, e.g., to generate a sufficient number of training gathers without performing additional migration computations.

With respect to the migration function, the migration function may correspond to one or more migration algorithms. In some embodiments, the migration function uses reverse time migration or another method (such as a phase-shift-plus-interpolation (PSPI) method) with various cross correlation time lags. As such, the migration function may be based on one-way wave-equation tomography, ray tracing, or two-way wave-equation tomography. However, other migration algorithms are contemplated based on other data domains (e.g., common receiver, common midpoint, common offset, common azimuth, etc.).

In some embodiments, the input data of a migration function are seismic gathers which have a vertical axis in time (i.e., recording time of the seismic experiment). The horizontal axis or axes of the seismic gathers may denote spatial location. Thus, the process of migration uses a velocity model to transform the vertical axis from time to depth. However, the output of a migration function may also transform the vertical axis into time coordinates. With knowledge of the velocity model, the vertical axis may simply be stretched from time to depth and vice versa. One benefit of a migration function may be that it ensures the seismic reflection energy is repositioned into location information (i.e., horizontally and vertically) where a reflection took place in the subsurface.

In Block 830, a trained model is generated using various training gathers, a machine-learning algorithm, and a machine-learning model in accordance with one or more embodiments. In some embodiments, for example, a pre-trained neural network is re-trained to predict migrated gathers from the training gathers. The training operation may be performed using one or more types of machine-learning algorithms, such as a supervised algorithm. In supervised learning, the trained model may be generated using a gradient-based optimization (e.g., a stochastic gradient descent process) to update weights and biases within the model such that a misfit between predicted image data and actual image data (i.e., based on a migration algorithm) is minimized.

After completing the training operation, a seismic interpreter may use a trained neural network to predict migrated gathers from the remaining portion of the unmigrated gathers. Thus, the trained model may provide an approximation of various computationally intensive migration steps, such as forward modeling, backward wavefield propagation, cross-correlations, and/or imaging per seismic gather. For more information on training operations and machine-learning algorithms, see FIG. 2 above and the accompanying description.

In Block 840, a seismic image of a geological region of interest is generated using a trained model and a remaining portion of seismic data in accordance with one or more embodiments. For example, a set of migrated gathers may be summed or stacked to produce a final seismic image (e.g., the migrated gathers in Block 820 and predicted migrated gathers determined using a trained model). Using a trained model, the computational burden of seismic data migration may be shifted toward training operations rather than performing migration algorithms on individual seismic gathers.

In Block 850, a presence of one or more hydrocarbon deposits is determined in a geological region of interest using a seismic image in accordance with one or more embodiments.

Computer System

Figure 9:
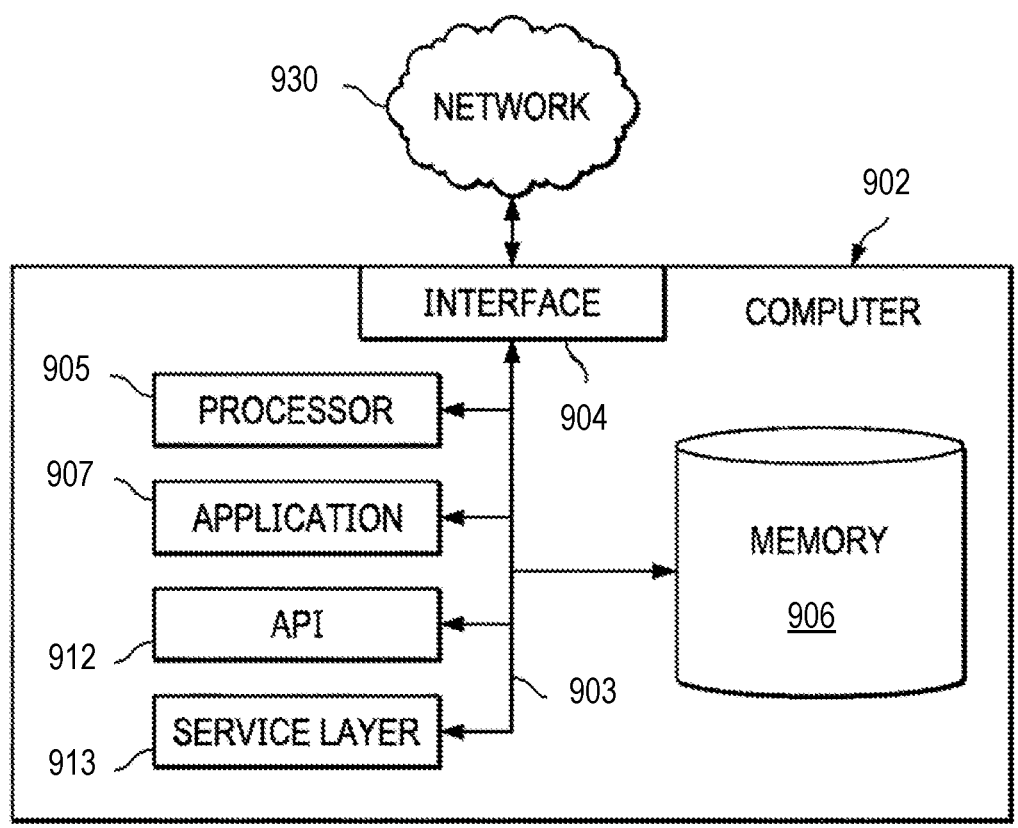
FIG. 9 shows a computing system in accordance with one or more embodiments.

Embodiments may be implemented on a computer system. FIG. 9 is a block diagram of a computer system used to provide computational functionalities associated with described algorithms, methods, functions, processes, flows, and procedures as described in the instant disclosure, according to an implementation. The illustrated computer (902) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930) or cloud. In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) or cloud from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930) or cloud. More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

In some embodiments, the computer (902) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:
1. A method, comprising:
obtaining, by a computer processor, an input gather regarding a geological region of interest, wherein the input gather comprises first seismic data that is acquired from a seismic survey;
obtaining, by the computer processor, first parameterization data regarding a first seismic processing operation, wherein the first parameterization data corresponds to a first plurality of process parameter values that are different from a second plurality of process parameter values used to generate the input gather, and wherein the first plurality of process parameter values and the second plurality of process parameter values are used to perform one or more demultiple functions for removing at least one surface multiple from the first seismic data;

generating, by the computer processor, a predicted output gather using a first machine-learning model, the input gather, and the first parameterization data,
wherein the first machine-learning model comprises an encoder model and a decoder model, and
wherein one or more surface multiples in the input gather are removed from the predicted output gather using the first machine-learning model;

obtaining, by the computer processor, a second machine-learning model, wherein the second machine-learning model is pre-trained to predict migrated seismic data;

selecting, by the computer processor, a plurality of training gathers based on a portion of a plurality of predicted output gathers comprising the predicted output gather, a migration function, and a velocity model;

generating, by the computer processor, a trained model using the plurality of training gathers, the second machine-learning model, and a machine-learning algorithm;

generating, by the computer processor, a seismic image of the geological region of interest using the trained model and a remaining portion of the plurality of predicted output gathers,
wherein the seismic image comprises depth data that describes one or more subsurface formations in the geological region of interest; and determining, by the computer processor, a predicted hydrocarbon deposit in the geological region of interest based on the one or more subsurface formations in the seismic image.

2. The method of claim 1, further comprising:
generating, using the first machine-learning model, compressed data within a latent space domain regarding the input gather; and
generating, using the first machine-learning model and the compressed data, combined data that amalgamates the compressed data with a vector corresponding to the first parameterization data, and
decoding, using the first machine-learning model, the combined data to produce the predicted output gather.

3. The method of claim 1, further comprising:
generating, using the first machine-learning model, a plurality of predicted output gathers using a plurality of input gathers and second parameterization data; and
determining a selected gather among the plurality of predicted output gathers and the plurality of input gathers; and
performing a second seismic processing operation using the selected gather.

4. The method of claim 1,
wherein the first machine-learning model is a variational autoencoder,
wherein the encoder model transforms the input gather into compressed data in a latent space domain, and
wherein the decoder model transforms the compressed data into the predicted output gather in a predetermined data domain of the input gather.

5. The method of claim 1,
wherein the first parameterization data corresponds to one or more process parameters selected from a group consisting of: a threshold value, a filter length, a predetermined noise level, a window size, a water bottom reflectivity, a water depth, a maximum frequency, a spatial distance between consecutive seismic traces, a number of azimuth sectors, an inline aperture, and a crossline aperture.

6. The method of claim 1,
wherein the first seismic processing operation performs a noise removal operation.

7. The method of claim 1,
wherein the predicted output gather corresponds to migrated data after a reverse-time migration function.

8. The method of claim 1, further comprising:
determining, using the second machine-learning model, predicted migrated seismic data based on input seismic data, wherein the input seismic data corresponds to a portion of a plurality of predicted output gathers;
determining error data based on a mismatch between the predicted migrated seismic data and a portion of the plurality of training gathers; and
updating the second machine-learning model using the error data and the machine-learning algorithm,
wherein the machine-learning algorithm is a backward propagation algorithm.

9. The method of claim 1, further comprising:
acquiring, using a seismic surveying system, second seismic data regarding the geological region of interest; and
generating the input gather from the second seismic data.

10. A method, comprising:
obtaining, by a computer processor, a first machine-learning model comprising an encoder model and a decoder model;
obtaining, by the computer processor, a plurality of input gathers based on a seismic processing operation,
wherein the plurality of input gathers comprise seismic data acquired from one or more seismic surveys, and
wherein the seismic processing operation performs one or more demultiple functions for removing at least one surface multiple from the seismic data;
obtaining, by the computer processor, first parameterization data for the seismic processing operation;
generating, by the computer processor, a first plurality of predicted output gathers using the first machine-learning model, the plurality of input gathers, and the first parameterization data;
updating, by the computer processor, the first machine-learning model using a first machine-learning algorithm and error data to produce a first trained model,
wherein the error data describes a mismatch between the first plurality of predicted output gathers and the plurality of input gathers;
obtaining, by the computer processor, an input gather regarding a geological region of interest;
generating, by the computer processor, a predicted output gather using the first trained model, the input gather, and second parameterization data for the seismic processing operation;
obtaining, by the computer processor, a second machine-learning model, wherein the second machine-learning model is pre-trained to predict migrated seismic data;
selecting, by the computer processor, a plurality of training gathers based on a portion of a second plurality of predicted output gathers comprising the predicted output gather, a migration function, and a velocity model;
generating, by the computer processor, a second trained model using the plurality of training gathers, the second machine-learning model, and a second machine-learning algorithm;

generating, by the computer processor, a seismic image of the geological region of interest using the second trained model and a remaining portion of the second plurality of predicted output gathers,
wherein the seismic image comprises depth data that describes one or more subsurface formations in the geological region of interest; and
determining, by the computer processor, a predicted hydrocarbon deposit in the geological region of interest based on the one or more subsurface formations in the seismic image.

11. The method of claim 10,
wherein the first machine-learning model is a variational autoencoder,
wherein the encoder model transforms the input gather into compressed data in a latent space domain, and
wherein the decoder model transforms the compressed data into the predicted output gather in a predetermined data domain of the input gather.

12. The method of claim 10,
wherein the first machine-learning algorithm is a supervised learning algorithm.

13. The method of claim 10, further comprising:
determining, by the computer processor, whether the error data satisfies a predetermined criterion, and
wherein the first machine-learning model is updated in response to the error data failing to satisfy the predetermined criterion.

14. The method of claim 13,
wherein the predetermined criterion is a predetermined degree of prediction accuracy.

15. A system, comprising:
a seismic surveying system comprising a seismic source and a plurality of seismic receivers; and
a seismic interpreter comprising a computer processor, wherein the seismic interpreter is coupled to the seismic surveying system, the seismic interpreter comprising functionality for:
obtaining an input gather regarding a geological region of interest, wherein the input gather comprises seismic data that is acquired using the seismic surveying system;
obtaining first parameterization data regarding a first seismic processing operation,
wherein the first parameterization data corresponds to a first plurality of process parameter values that are different from a second plurality of process parameter values used to generate the input gather, and
wherein the first plurality of process parameter values and the second plurality of process parameter values are used to perform one or more demultiple functions for removing at least one surface multiple from the seismic data;
generating a predicted output gather using a first machine-learning model, the input gather, and the first parameterization data, wherein the first machine-learning model comprises an encoder model and a decoder model, and
wherein one or more surface multiples in the input gather are removed from the predicted output gather using the first machine-learning model;
obtaining a second machine-learning model, wherein the second machine-learning model is pre-trained to predict migrated seismic data;
selecting a plurality of training gathers based on a portion of a plurality of predicted output gathers comprising the predicted output gather, a migration function, and a velocity model; and
generating a trained model using the plurality of training gathers, the second machine-learning model, and a machine-learning algorithm;
generating a seismic image of the geological region of interest using the trained model and a remaining portion of the plurality of predicted output gathers, wherein the seismic image comprises depth data that describes one or more subsurface formations in the geological region of interest; and
determining a predicted hydrocarbon deposit in the geological region of interest based on the one or more subsurface formations in the seismic image.

16. The system of claim 15, wherein the seismic interpreter further comprises functionality for:
generating, using the first machine-learning model, compressed data within a latent space domain regarding the input gather; and
generating, using the first machine-learning model and the compressed data, combined data that amalgamates the compressed data with a vector corresponding to the first parameterization data, and
decoding, using the first machine-learning model, the combined data to produce the predicted output gather.

17. The system of claim 15, wherein the seismic interpreter further comprises functionality for:
generating, using the first machine-learning model, a plurality of predicted output gathers using a plurality of input gathers and second parameterization data; and
determining a selected gather among the plurality of predicted output gathers and the plurality of input gathers; and
performing a second seismic processing operation using the selected gather.

* * * * *